Dec. 9, 1947.  B. E. LUBOSHEZ  2,432,430
GYROSCOPIC STABILIZER
Filed Dec. 27, 1943  2 Sheets-Sheet 2

BENJAMIN E. LUBOSHEZ
INVENTOR
BY
ATTORNEYS

Patented Dec. 9, 1947

2,432,430

UNITED STATES PATENT OFFICE 2,432,430

GYROSCOPIC STABILIZER

Benjamin E. Luboshez, Rochester, N. Y., assignor to Eastman Kodak Company, Rochester, N. Y., a corporation of New Jersey Application December 27, 1943, Serial No. 515,715

16 Claims. (Cl. 74—5)

The present invention relates to a stabilizer for a reference plane in navigation instruments, gun platforms, etc., on moving vehicles, and particularly to a stabilizer of this type which is gyroscopically controlled.

One object of the present invention is to provide a gyroscopic stabilizer which is designed to oppose disturbing external forces acting about any axis whatever and tending to disturb the frame that is to be stabilized, said stabilizer comprising a plurality of pairs of gyroscopes, each pair being coupled together so as to precess oppositely by equal amounts about parallel axes and being oriented to respond to forces tending to move the frame from a given position.

Another object is to provide a gyroscopic stabilizer including gyroscopes which are each normally urged to their central position of precession, and in which damping means are provided to prevent an oscillation of the gyroscopes in their precessional movements.

And another object is to extend the time of precession of the gyroscopes to counteract any disturbing external forces of long duration without reducing the sensitivity of the device to small disturbances.

A further object of this invention is to provide a measure of protection to an instrument designed for high precision against the violent movements it would be subjected to under combat conditions. Such violent movement might put the instrument temporarily out of commission until a new state of equilibrium could be attained.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which.

Like reference characters refer to corresponding parts throughout the drawings.

Many gyroscopic stabilizers have been devised in the past, but few of them have been of any practical value mainly owing to a misunderstanding of the basic principles of gyrodynamics. These principles can be enunciated in a few words, and since it is essential to be familiar with them in order to understand the working of the multiple gyroscope devices which form the subject of this invention, the basic principles will be briefly reviewed.

Figures 1, 2, 3, 8:
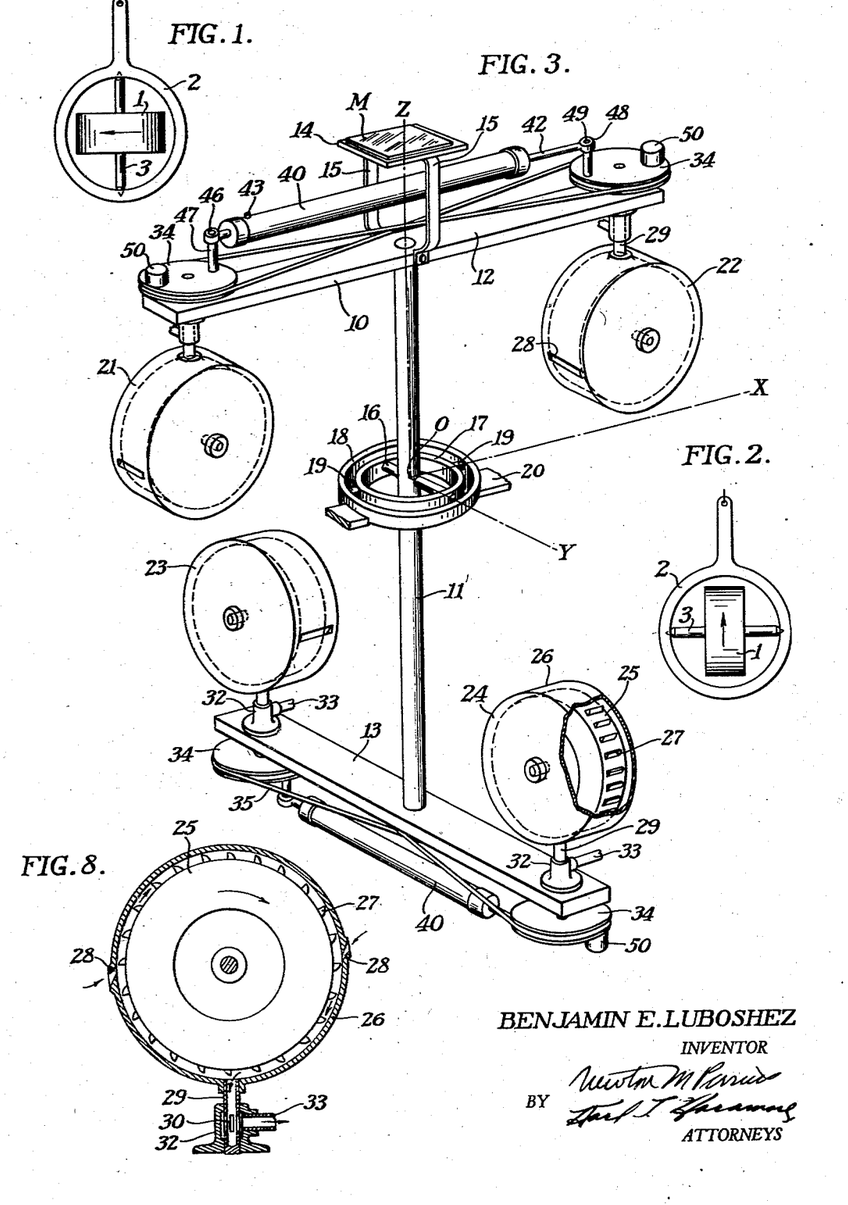
Figs. 1 and 2 are elevational details showing different gyroscopic pendulum suspensions used to set forth the basic principles of gyro-dynamics.
Fig. 3 is a perspective view of a gyroscopic stabilizer constructed in accordance with one embodiment of the present invention.
Fig. 8 is a vertical section of one of the gyroscopes showing one manner of driving the same.

Referring to Fig. 1, consider a gyroscope 1 with an axle 3 to be pivoted so as to be rotatable in a horizontal plane within the supporting ring 2, which is freely suspended like a pendulum in the manner indicated. This device constitutes a gyroscopic pendulum, which is free to swing in any direction.

When the gyroscope is not rotating, the device is the equivalent of a compound pendulum which is free to swing in any direction with a period of oscillation appropriate to the radius of gyration about the point of suspension and to the distance between the point of suspension and the center of gravity; it ultimately comes to rest in the vertical position, assuming no other accelerational forces to be present. When, however, the gyroscope is rotated, the device becomes a gyroscopic pendulum, and simple oscillations are no longer possible. Thus, suppose the gyroscope, rotating in the direction indicated, be pushed to the right by an external force (such as a change in the direction of apparent gravity). This is equivalent to a pure translational movement to the right plus an anti-clockwise couple about an axis perpendicular to the plane of the diagram, and it is this couple which gives rise to a gyroscopic couple and a gyroscopic reaction. The gyroscope, if free to move about the point of suspension, will oppose any change in the direction of its axis, and it can be shown that a gyroscopic couple will be generated which will tend to push the gyroscope in a direction at right angles to that in which the original impulse is given. Under the conditions specified, this couple will tend to swing the pendulum out of the plane of the diagram towards the observer, and the reaction will be toward the left of the diagram opposing the original impressed movement. If such a device be used to indicate the vertical, it is clear that the remedy is as bad as the original trouble, for the displacement in the plane of the paper, which it has been sought to avoid or minimize, has been transformed into a movement in the plane at right angles.

Suppose now that in an attempt to suppress this latter movement the pendulum be so pivoted about an axis perpendicular to the diagram that the pendulum is constrained to move only in one plane (that of paper). Under these conditions, an impulse to the right or left would meet with neither more nor less resistance than if the gyroscope were not rotating. That is to say, the constraint has not only suppressed any physical manifestations of the gyroscopic couple (i. e., the precession) but with it, has eliminated the gyroscopic reaction as well, and the device has thus become an ordinary pendulum. The only remaining reaction is that induced by the constraint—a couple equal and opposite to the gyroscopic couple—and this has no other effect than an increase in friction.

Consider next, the case when the gyroscopic axis is located in the manner shown in Fig. 2. If the frame be suspended so as to be free to swing in all directions and rotate about a vertical axis, then the following effects take place; displacements at right angles to the axis of rotation of the gyroscope produce no reactions whatever (since the couples are in the plane of rotation) so that the device acts as an ordinary pendulum, and there is thus no object in having the gyroscope at all. Displacements of the pendulum in the same plane as the axis of the gyroscope, however, cause the latter to change direction, and hence introduce a gyroscopic couple. With the direction of rotation indicated, a displacement to the right causes a gyroscopic couple to be generated which tends to rotate the pendulum about a vertical axis, in an anti-clockwise direction as viewed from the top. If the device be so suspended as to make this movement possible, then it will take place and will do so at the expense of the original displacement. Meanwhile, the original displacement will be resisted, and by suitable design, this displacement can be made almost as small as possible. However, if the rotation caused by the gyroscopic couple be forcibly prevented from taking place, the device again becomes an ordinary pendulum, and the gyroscope does nothing beyond putting a twisting force on the holding means.

A device of this kind (but arranged for freedom of rotation about a vertical axis), would resist attempts to displace it provided that one could be assured that the disturbing couple would always take place in the plane of the axis of the gyroscope or at least have a component in that plane. This, however, cannot be arranged with a single gyroscope; and moreover, since the effort being resisted causes the gyroscopic axis to rotate out of the plane in which the disturbance is taking place, some means must be provided for bringing it back. It is evident that the gyroscopic effect of a single gyroscope located as in Fig. 2 cannot be utilized to resist simultaneous displacement in two planes at right angles since the resultant displacement (or couple) might be in any direction and might even happen to be in the plane of rotation of the gyroscope itself.

According to the present invention an instrument designed to oppose disturbing couples acting about any axis whatever, comprises a minimum of three pairs of gyroscopes, each pair of oppositely rotating identical gyroscopes being geared together to precess about parallel axes in opposite directions by equal amounts. The disposition of the pairs relative to each other is such that each pair opposes rotation about one particular axis, one pair taking care of couples about XX' axis, another about the YY' axis, and the third about the ZZ' axis. For example, the precessional axes of the first pair of gyroscopes might be parallel to the ZZ' axis, with the gyroscopic axes of rotation initially parallel to the YY' axis, the precessional axes of the second pair might be parallel to the XX' axis, with the axes of rotation initially parallel to the ZZ' axis, and the precessional axes of the third pair might be parallel to the YY' axis with the axes of rotation initially parallel to the XX' axis.

The operation of the complete device is based upon the principle that two identical gyroscopes rotating at the same speed in opposite directions, and coupled together to precess by equal and opposite amounts, are responsive to rotation about only one given axis. In the special case where the present gyroscopic stabilizer is applied to instruments where stabilization about horizontal axes only is required, as in artificial horizons for sextants, it is not necessary to provide for opposition to couples about a vertical axis, and a minimum of only two pairs of gyroscopes on a common pendulous frame is required.

A convenient, practical arrangement in the latter case is to arrange for all of the rotational axes of the gyroscope (in the normal positions of precessions) to be parallel to the OZ axis, and for the precessional axes of the pair opposing rotations about the OY axis to be parallel to the OX axis; and for the precessional axes of the pair designed to oppose rotation about the OX axis to be parallel to the OY axis.

Another convenient arrangement is to have all the precessional axes parallel to the OZ axis and then to arrange for the rotational axes (in the central or zero position) of the pair of gyroscopes opposing rotation about the OX axis to be parallel to the OY axis, and for the rotational axes (in the central or zero position) of those designed to oppose rotations about the OY axis, to be parallel to the OX axis.

In all of these devices it is essential to provide some damping means for absorbing the energy communicated to the gyroscopes, so as to avoid oscillations and the building up of large amplitudes. The means for achieving this result without impairing the sensitivity of response forms an important part of the present invention and will be considered later in this specification.

The object in providing pairs of oppositely rotating identical gyroscopes instead of single ones, and in limiting them for equal and opposite precessions, can best be explained by considering what would take place if the individual gyroscopes of each pair were made to precess independently.

Thus, consider the effect of an outside disturbing couple, acting about any horizontal axis, upon the pair of gyroscopes designed to oppose rotation about the OX axis, but with the individual gyroscopes of the pair free to precess in the direction and by the amount appropriate to the direction and magnitude of the component of the couple acting about the OX axis. In the initial position, since the precessional axes would be parallel, a disturbing couple tending to rotate the carrying frame about an axis perpendicular both to the axes of rotation and the axes of precession would cause the gyroscopes to precess by equal amounts in opposite directions.

However, in the general case the precessions would not continue at equal rates, for as soon as an outside disturbing couple causes the precessions to start, the principal axes of rotation of the gyroscope deviate more and more from the parallel position until they have rotated through 45° when they again approach parallelism until in the limit, at 90° they are parallel again, but both gyroscopes are now rotating in the same direction. Until the latter position is reached, both gyroscopes unite to oppose the impressed couple. It is important to notice that so long as the two precessions take place at equal rates (in opposite directions), the components of the gyroscopic reactions which are not in the plane of the original disturbing couple are equal and opposite, and cancel each other; but if the precessional rates are not equal, unbalanced couples remain to disturb the equilibrium of the carrier frame. Lack of equality in the rate of precession of the two gyroscopes must, however, inevitably arise in practice because of the unsymmetrical manner in which disturbing couples may be applied to the frame.

In the general case, any disturbing couple applied to the carrier frame may be resolved into three parts, one about each of three axes—X, Y, and Z—mutually at right angles. Consider what happens to a pair of identical gyroscopes oppositely rotating and mounted on a common frame, their axes of rotation (in the starting position) being parallel to the Y axis and their precessional axes being parallel to the Z axis. At the start, only those couples, or components of couples, acting about an axis parallel to the X axis will cause precession to take place, and at the instant of starting, the amount will be the same for both gyroscopes and in opposite directions. Just as soon, however, as the precession has started and the rotational axes of the gyroscopes are no longer parallel with each other, the component of the impressed couple about an axis in the XOY plane perpendicular to the rotational axis of one of the gyroscopes is not the same as the component perpendicular to the axis of the other gyroscope, with the result that rates of the two precessions are no longer identical. Hence, after a short time, the axis of the two gyroscopes, instead of making equal angles on either side of the Y axis, make different angles, and perfect symmetry (with the resultant cancellation of the unwanted gyroscopic reactions) is no longer possible.

It is in order to avoid this that according to the present invention the two gyroscopes of any one pair (whose rotational axes are initially parallel to the Y axis and whose precessional axes are parallel to the Z axis) are constrained so as to precess always through equal angles in opposite directions by means of appropriate mechanical connections, such as gear wheels or their equivalent. As a result, all unwanted gyroscopic reactions cancel out and whatever the direction of the axis of the impressed disturbing couple, the resultant of the gyroscopic reactions always opposes that component of the impressed couple which acts about the OX axis. At the same time, the particular pair of gyroscopes involved is indifferent to the other components of the impressed couple.

A practical instrument designed to oppose disturbing couples acting about any axis whatever comprises a minimum of three pairs of gyroscopes, each pair being connected together so as to precess oppositely by equal amounts about parallel axes as above explained. As previously explained, the disposition of the pairs relative to each other is such that each pair opposes rotation about one particular axis, one pair taking care of couples (or their components) about the X axis, with the other about the Y axis, and the third about the Z axis.

In the special case of a gyroscopic level, such as a mirror used as an artificial horizon in sextants, it is not necessary to provide for opposition to impressed couples about a vertical axis, and, consequently, only two pairs of gyroscopes on a common pendulous frame are needed. Therefore, inasmuch as this case clearly sets forth the principles of the present invention, even though it only stabilizes a frame against outside rotational disturbances about any horizontal axis and is more simple to describe and understand than a case using three pairs of gyroscopes, the special case of the gyroscopic level will be specifically referred to in disclosing the invention.

In Fig. 3, there is shown a gyroscopic stabilizer constructed in accordance with one embodiment of the present invention which is adapted to hold a mirror M level, and which mirror may constitute an artificial horizon of a sextant. It is pointed out that instead of the device being used to maintain a mirror level, said mirror might be a gun platform, or any other reference plane, mounted on a vehicle subject to pitching and rolling, which it might be desired to maintain level at all times.

Referring now to Fig. 3, the gyroscopic stabilizer shown comprises a carrying frame, indicated generally as 10, and which frame includes a vertical shaft 11 to opposite ends of which are attached horizontal cross arms 12 and 13. As shown, the cross arms 12 and 13 are disposed at right angles to one another. A platform 14 carrying the mirror M, or any other member which is to be maintained level, is mounted on spaced arms 15 above the upper cross-arm 12 and in parallel relation thereto. The middle of the shaft 11 has extending therefrom two pivot pins 16 which pivotally engage a gimbal ring 17. The gimbal ring 17 in turn is pivotally connected to another gimbal ring 18 by pivot pins 19 which are disposed at right angles to said first-mentioned pivot pins. The outer gimbal ring 18 is in turn rigidly attached to a supporting base 20 which may be a standard adapted to rest on the vehicle carrying the device, or may be brackets directly connected to the vehicle carrying the device. In other words, the supporting base may be a tripod setting on the floor of a vehicle, or it may be the vehicle itself, an aeroplane, tank, ship, etc. This gimbal mounting for the carrying frame 10 allows the frame to rotate freely about any horizontal axis and, therefore, constitutes a means for pendulously supporting said frame.

The stabilizer includes four gyroscopes indicated generally as 21, 22, 23, and 24. While the gyroscopes may be of any well-known construction and may be driven in any suitable manner, as by air or electricity, for purposes of illustration, I have shown these gyroscopes as being of the air-driven type and comprising a gyro wheel 25 rotatably mounted within a casing 26. As shown in Figs. 3 and 8, the periphery of the gyro wheel is provided with a plurality of spaced cups 27 into which jets of air at high velocity, entering one or more spaced nozzles 28 in the periphery of the casing, impinge to drive the wheel. The nozzles open to the atmosphere and the high velocity jets of air are obtained by evacuating the cases 26 to cause a drop of pressure through the nozzles. For the purpose of evacuating the casing, and at the same time providing a supporting means for each gyroscope on the frame an axle 29 is connected to the rim of these cases and the end of the axle engaging the casing is hollow and opens into the interior thereof. The hollow portion of the axle includes a plurality of radial openings 30 through which the casing may be evacuated by attaching the same to any suitable evacuating mechanism, not shown.

The gyroscopes 21 and 22 are mounted on opposite ends of the upper cross arms 12 with their rotational axes initially, or normally, parallel and with their precessional axes (axles 29) vertical. The gyroscopes 23 and 24 are mounted on opposite ends of the lower cross arms 13 and with their rotational axes initially, or normally, parallel and at right angles to the rotational axes of gyroscopes 21 and 22, and with their precessional axes vertical. Each gyroscope is mounted on the cross arm so as to be free to precess about the vertical axis and this is accomplished in the present instance by rotatably supporting the axle 29 of the gyroscope in the cross arms in any suitable manner. The axle 29 of each gyroscope assembly therefore, constitutes the precessional axis of the gyroscope. The gyroscopes of each pair are rotated in opposite directions at identical angular momentum.

Identical angular momentums are most easily obtained by making the gyroscopes of each pair identical and rotating them at the same speed; but should the gyroscopes happen to be of different physical proportions, identical angular momentum can be obtained by properly adjusting their relative speeds to account for the difference in their physical proportions. In the present instance, it will be assumed that the gyroscopes of each pair are identical, in which case they can be readily made to run at the same speed by evacuating each gyro casing simultaneously with the same evacuating means. With the gyroscopes mounted as shown in Fig. 3, the radial exit ports 30 of the axle 29 may be covered by a sleeve 32 fixed to the cross arm and having a substantially air-tight connection with the axle, this sleeve including an exit port 33 in communication with the exit port 30 of the axle and to which the tube of an aspirator, or other evacuating means, might be attached to evacuate the gyro casing.

Each gyroscope assembly carries a pulley 34 which is attached to the end of the axle 29 extending to the side of the cross arm opposite that adjacent the gyroscopes. Accordingly, these pulleys are adapted to oscillate when the respective gyroscope assemblies precess from their initial, or central, positions due to the rotation of the carrying frame 10 from its vertical position induced by external forces acting on the frame, such as an apparent change of gravity. The pulleys 34 of each pair of gyroscope assemblies are connected by a cross belt 35 so that each member of a pair of rotating gyroscopes is constrained to precess by equal amounts in opposite directions. Inasmuch as the pulleys 34 never make a complete rotation, the belt may be fixed at one point to each pulley in order to eliminate any chance of the belt slipping on the pulley. Furthermore, the belt need not be an endless one as shown, but could be a length of belting sufficiently long to wrap around a substantial portion of each pulley and be fixed at its end to the respective pulleys.

All of the gyroscopes are balanced as closely as possible both statically and dynamically about their axes of rotation. In addition, all of the gyroscope assemblies are balanced statically about a vertical axis so that when they precess, they shall not, in their new positions, upset the equilibrium of the instrument as a whole. Adjustable balance weights, not shown, may be provided for this purpose. Of course, it will be realized from the previous discussion, that all of the gyroscopes must be identical, (i. e. rotate at equal speeds, and have the same moments of inertia about their rotational axes, or at least the product of these quantities must be equal), and, in addition, the moments of inertia of the gyroscopic assemblies about a vertical axis must be identical in order that all unwanted gyroscopic couples may be eliminated.

The operation of the specific stabilizer shown in Fig. 3 will be clearly understood from the foregoing general description of the principle of operation of the present invention, when the coordinate axes OX, OY, and OZ, shown in Fig. 3, are referred to, so that no repetition of the principles of operation are deemed necessary at this point. It will suffice to say that when the gyroscopes are in motion, simple oscillations of the carrying frame and platform 14 thereon about horizontal axes, due to pitching, rolling, or yawing of the vehicle on which the device is mounted, are no longer possible as the gyroscopic reactions strongly resist such attempts. The gyroscopes may be regarded as serving to reduce the oscillations of the compound pendulum assembly of which they form a part, and it is possible to obtain an instrument of very long period of oscillation which is at the same time practically deadbeat.

It is necessary to the operation of any gyroscopic stabilizer that the gyroscopes return to their initial, or central precessional position when the external forces causing a given precession subside. In some cases, the general averaging tendency of the pendulous support is relied upon to assure the return of the gyroscopes to their central positions, but most generally, spring returns are provided which normally urge the gyroscopes to their central positions. The spring returns are most desirable because of the fact that the device is thereby returned more quickly to its position of maximum response, but excessive use of springs introduces disadvantages, such as rendering the device less sensitive to initial small external disturbing forces and tending to set up oscillations in the precessional movement of the gyroscopes due to the fact that the spring action repeatedly acts to move the gyroscopes past their central positions.

Accordingly, all gyroscopic levels of which I am aware, and especially those employing spring return control on the gyroscope, would continue to oscillate according to their natural periods of oscillation until the motion has been damped out by friction. For all practical purposes, centralizing springs, or other suitable means, are, according to the present invention, used for regulating and limiting the movement of the stabilizing gyroscopes, and for bringing them back to their initial or central positions of precession when they have precessed away from it and after the exciting force has subsided. Applicant, however, provides an improved and novel apparatus for applying this centralizing force to the gyroscopes, said apparatus being shown in Figs. 3 and 6 and being fully described hereinafter.

In order to lay the proper background for a clear appreciation of applicant's novel centralizing control of the gyroscopes, it is believed to be in order to analyze the movements of the present instrument if ordinary centralizing spring controls were used on the individual gyroscopes. In this connection, the movements of the present instrument, if equipped with ordinary centralizing spring controls, under the influence of disturbing couples is most simply discussed by consideration of the results of a mathematical analysis. The analysis is not difficult if the discussion be limited to small angular displacements in which angles (in circular measure) are considered equal to their sines and if the cosines of these angles be considered as equal to unity. Thus it can be shown that the motion can be analyzed into two periodic functions about each of two horizontal axes mutually at right angles. We can consider either the OX axis, to which the two upper gyroscopics in Fig. 3 respond, or the OY axis, to which only the lower pair of gyroscopics respond, and obtain the same result in both cases.

The two periodic superimposed motions are due, one to the precessional movement of the gyroscopes, and the other, to the nutational movements of the gyroscopes. The former are long period oscillations, and the latter are of short period. For most practical purposes, the long period oscillations (precessional) are required to be as long as possible in order to delay the response of the instrument to outside disturbances, while the short period oscillations (nutational) are made as short as possible so that they shall become rapidly damped out and be so rendered harmless. The following equations show exactly what steps must be taken in the design of the instrument to achieve any desired result, but they do not take into account friction or any damping means that might be employed.

$Tp$ = the precessional period and $Tn$ the nutational period.

$C$ = the moment of inertia of one gyroscope about its rotational axis.

$A$ = the moment of inertia of one gyroscope about its precessional axis.

$B$ = the moment of inertia of the whole pendulous frame and all the gear about the OX and OY axes.

$w$ = the angular velocity of each gyroscope about its rotational axis.

$M$ = the mass of the whole of the pendulous system.

$h$ = the distance between the center of gravity of the pendulous system and its center of gravity.

$P$ = the pull of one of the restoring springs per unit precessional angle.

$r$ = the radius at which the spring is attached from the center of the precessional axle.

then: for either the OX or the OY axes:

$$Tp = 2\sqrt{2}.\pi.C.w/\sqrt{M.g.h.P.r}$$

and $$Tn = \sqrt{2}.\pi.\sqrt{A.B}/C.w$$

It is clear from these equations, that since it is desirable to have $Tp$ as large as possible the angular momentum of each gyroscope ($C. w.$) must be as great as possible. Furthermore, in order to make $Tp$ large for a given supported mass, the position of the center of gravity of the pendulous frame must be brought up as close as practical to the level of the pivot points. The only limits to this are the unavoidable friction at the pivots and the need for an accurate return of the frame to zero after all disturbances have been removed. The value of the restoring couple ($P. r.$) can, however, be made almost as small as may be desired and thus can be regulated to provide almost any desired period of oscillation. The only limit to the reduction in the restoring couple is the friction about the precessional axes, and since very accurate restoration to the zero positions of precession is of no importance to the precision of the instrument, friction is not a serious limitation in this instance.

In one of the most useful forms of this invention, the spring (or equivalent) restoring device, is deliberately designed so as to exert no force at all in, and close to, the zero or central position of precession, but to come into action progressively with greater strength as the precessional angles increase beyond certain small predetermined values. This is achieved very simply in practice by the use of the novel restoring means shown in Figs. 3 and 6 which will now be described.

Figures 4, 5, 6, 7:
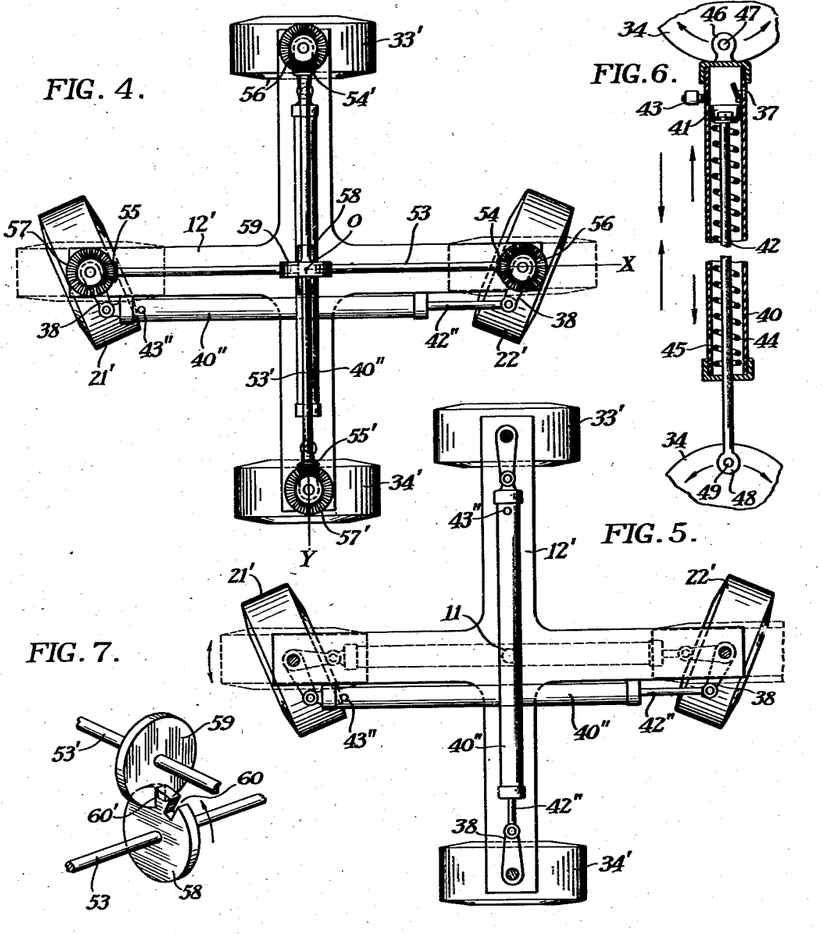
Fig. 4 is a top plan view of the gyroscopic stabilizer shown in Fig. 3 and modified in accordance with a second embodiment of the present invention, the pendulously mounted frame to be stabilized having crossarms at the top and bottom rather than a single horizontal bar as in Fig. 3.
Fig. 5 is a view similar to Fig. 4, but taken below the plane of the gear connection between the pairs of gyroscopes to clearly show the means for damping oscillations of the gyroscopes.
Fig. 6 is a sectional view of the restoring and damping means for the gyroscope and its manner of connection with the gyroscopes.
Fig. 7 is an enlarged perspective detail showing the interlock between the pairs of coupled gyroscopes.

Referring now to Figs. 3 and 6, the individual gyroscopes of each pair are urged to their normal or central precessional position, when away therefrom, by an arrangement including a fluid cylinder 40 which includes a piston 41, a piston rod 42, and adjustable exit port 43 of well known design located ahead of the piston, a compression spring 44, and a normally open port 45 behind the piston. As shown, the bottom of the cylinder is provided with a bearing 46 for pivotally connecting one end of the cylinder to a post 47 located eccentrically on the upper face of the pulley 34 of one gyroscope assembly. The end of the piston rod 42 is likewise provided with a bearing 48 by means of which it may be pivotally connected to a post 49 located eccentrically on the upper face of the pulley 34 on the other gyroscope assembly of the pair. Counterweights 50 may be mounted on the pulleys 34 of the respective gyroscope assemblies to account for the weight of the cylinder and to statically balance the instrument.

As shown in Figs. 3 and 6, when the gyroscopes of each pair are in their central or initial precessional positions, the posts 47 and 49 on the pulleys 34 are in their nearest relationship and the piston is moved to its innermost position in the cylinder. Inasmuch as the two gyroscopes are coupled to precess in opposite directions by equal amounts, the cylinder will always tend to move one side or the other of the central position when the gyroscopes precess and the piston will be moved outwardly in the cylinder. This movement of the cylinder will be readily understood from inspection of Figs. 4 and 5, which relates to another embodiment of the device but which shows the same cylinder in two positions it might assume when the gyroscope of a pair are in their normal precessional positions (dotted line position) and when they have precessed away therefrom (full line position). The port 45 in the cylinder 40 is large enough so that it offers no restriction to the exit of the air when the piston moves outwardly, and a one-way check valve 37 may be provided to allow the free entrance of air into the cylinder. Consequently, there is no build up in pressure in the cylinder behind the piston which would resist a precessional movement of the gyroscope and subsequently act to urge the gyroscopes toward their normal positions, even though this might be useful under certain circumstances.

In the present instance, the compression spring 44 is relied upon to urge the gyroscopes to their central positions of precession. To this end, the compression spring 44 is located between the back of the piston 41 and the top of the cylinder. The spring is so designed that its normal overall length is slightly less than the distance between the piston and the top of the cylinder when the piston is in the position it assumes when the gyroscopes of each pair are in their normal positions of precession. Accordingly, as a precessional movement of the gyroscopes from their central positions causes the piston to be moved outwardly of the cylinder, the spring offers no resistance at all to the initial precessional movement. However, as the precessional movements of the gyroscopes continue the spring is more and more compressed, and the resistance built up will expend itself to cause the return of the gyros to their central positions when the disturbing external force causing such precession subsides. When the disturbing external force subsides, and the spring acting through the piston and cylinder urges the gyroscopes to their central positions, the restricted passage of air from the cylinder through the adjustable port 43 will act to damp out the oscillations in the precessional movement which would be inherent in the device as set forth above. The adjustable port 43 can be adjusted to give any desired degree of damping action which the particular application of the stabilizer might require.

Figure 9:
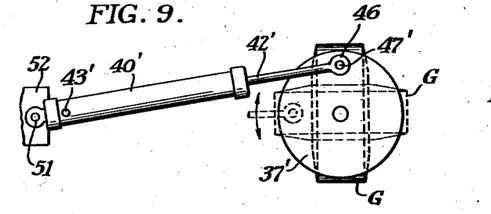
Fig. 9 is a partial top plan view showing how the present oscillation damping means can be used on a single gyroscope.

While the specific arrangement herein disclosed for centralizing the gyroscopes and damping out oscillations thereof is particularly adapted for use with pairs of precessionally linked gyroscopes for opposing impressed couples about a given axis, it is equally applicable to a single gyroscope for the same purpose, as illustrated in Fig. 9. In this figure I have shown the fluid cylinder 40' pivoted at one end 51 to a support 52 fixed relative to the gyroscope, and the piston rod 42' pivoted at 47' to a post located on a disk 37' located eccentrically of the precessional axle of the gyroscope G. The gyroscope is shown as having precessed 90° from its central position (dotted line position) and the piston rod moved outwardly of the cylinder. When the external force which caused this precession subsides, the spring in the cylinder will urge the gyro back toward its central position and the restricted passage of air from the cylinder will damp out the oscillations of the gyro, all as set forth in connection with the instrument using pairs of coupled gyroscopes.

It is clear from the periodic equations previously discussed that some means for damping out oscillation must be employed if a practically useful instrument is to be produced. It means that energy must be extracted from the system. Several methods have been used in the past for damping oscillations, including ordinary friction (i. e. band brakes on drums), fluid friction and electro-magnetic devices, and all of these methods convert the surplus energy ultimately into heat but at the expense of the sensitivity of the instrument.

According to the present invention, the damping means are applied about the precessional axes of the gyroscopes, while the swinging movements of the pendulous frame as a whole are made as free of friction or other resistance as possible so as not to reduce either the accuracy of the zero position of the frame or the sensitivity of response. Further, the unavoidable normal frictional resistance about the precessional axes is reduced as far as possible and all frictional or other damping of the precessions of gyroscopes in their movement away from their central (or initial position) is made as small as practical design can make it. On the other hand, the actual damping is achieved, according to my invention, by offering frictional, or other energy dissipating means of opposition to the movements of the gyroscopes about their precessional axes only when they are in process of returning to their central position and at no other time. Thus the sensitivity of the instrument is not impaired by the introduction of damping as it would be were the usual means of damping adopted. These usual means such as they have been used in the past have consisted either in the provision of energy dissipating means to all of the movements indiscriminately, or in making the damping force proportional to the speed of the movement, or in regulating it according to some other law; but never so far as I am aware, has the novel system of damping which I have described above been used or suggested.

My method of damping is not necessarily the most efficient for dealing with regular periodic disturbances, but that is of no importance. Except in certain cases on shipboard, the outside disturbing forces are rarely truly periodic, and when they are, they never maintain a constant periodicity or phase relationship for a sufficient length of time to be of any consequence. In any case, efficiency in damping is of very much less consequence in the present connection than is sensitivity. Where maximum precision is the primary consideration, as in the present invention, it is essential that the gyroscopes should be as free as possible to precess away from their central positions so as to exert their maximum reaction to any applied couples at their very inception.

The simple instrument described functions satisfactorily so long at the disturbing external forces do not continue to act for a longer period than is taken by the gyroscopes to reach the limit of their precessional movement, for after that the resistance to the external forces ceases. Any attempt to prolong the time during which precession takes place, by frictional means, stronger springs, or otherwise, reduces the sensitivity to small disturbances so that a limit is soon reached depending upon the desired precision. According to another feature of this invention, this difficulty is overcome by the use of a plurality of groups of gyroscopes, each group conforming to the principles previously mentioned, which method although retaining the sensitivity to small disturbances of long duration (or larger disturbances of short duration), provides means for dealing with long continuous disturbances which are beyond the range of the more sensitive elements. According to one form of the invention the movements of the gyroscope comprising any one group are constrained (by friction, springs, or otherwise) to a greater or lesser degree than the movements of other groups so that different groups have different sensitivities. Thus, when the gyroscopes comprising the most sensitive group have reached the end of their movement, those in the next sensitive group have only just commenced to move, and so on with the following group.

It is frequently necessary to provide a measure of protection to the instrument against the violent movement to which it might be subjected under practical conditions, since any violent movement might put it temporarily out of commission. Owing to the fact that the instrument is deliberately designed to have a long periodicity, time would be wasted in waiting for equilibrium to be again established with the ever-present danger that readings might be taken with the instrument before the desired condition had been obtained, assuming, of course, that the gyroscope stabilizer is being used to stabilize the artificial horizon of a sextant or similar instrument.

This can be guarded against by means explained above. Thus, the instrument is provided with a primary sensitive group of gyroscopes, as well as with a second (and perhaps a third) heavier series having much stronger restraint and whose principal function is to prevent any large departure from the horizontal from ever taking place even during violent maneuvers. Thus the instrument is always maintained in a position that does not depart very substantially from the horizontal, and the most sensitive of the gyroscopic elements are thus able to provide the fine adjustment. Not having to cope with coarse adjustments, they can be designed to speedily and accurately cope with the fine ones.

The best way of utilizing this idea so as to deal with disturbances of very long duration is to arrange matters so that each succeeding group, or series, of gyroscopes is allowed to come into action only after the preceding group has reached the limit of its travel. In this case, appropriate gyroscopes of each group upon reaching the limiting position, release catches or other restraints and set the corresponding gyroscopes in the next group free to process and, hence, to exert their reaction.

Figs. 4 and 5 show a simple way in which this can be carried out in practice. The instrument is similar to that shown in Fig. 3 with the exception that there are two pairs of linked gyroscopes on the upper cross arm 12' and two pairs on the lower cross arm (not shown). These two pairs of gyroscopes constitute the "groups" of gyroscopes referred to in the discussion immediately preceding. Since the carrying frame is pendulously mounted as before and the upper and lower assemblies are identical, but turned through 90° in orientation about the OZ axis, only the upper assembly is shown in plan view in Figs. 4 and 5. In this instance, the cross arm 12' is in the form of a cross, instead of a bar as in Fig. 3, to accommodate two pairs of gyroscopes 21', 22', 33', and 34' in quadrant relationship. The gyroscope assemblies are of the same construction as previously set forth and are rotatably mounted on the arms of the cross member with their precessional axes vertical and with their rotational axes initially parallel to the OY axis, referring to the axis designation used in Fig. 3. For purposes of illustration, the pair of gyro assemblies 21' and 22' have been shown in a precessed position, having precessed from the central position (indicated in dotted lines) through about 60° to the position shown.

In this embodiment, the respective pairs of gyroscopes 21', 22' and 33', 34' are coupled for equal and opposite precessions by means of shafts 53 and 53' joining the small bevel gears 54, 55 and 54', 55' which engage larger bevel gears 56, 57 and 56' 57' attached to the precessional axles of the gyroscopes 21' and 22' and 33' and 34' respectively, instead of the belt and pulley arrangement set forth in Fig. 3. The pairs of gyroscopes 21', 22' and 33', 34' are urged to their central, or normal, positions of precession, and the oscillations are damped, by fluid cylinder 40'' the same as in Fig. 3, the only difference here being that the end of the cylinder and the end of the piston rod are pivoted to radial arms 38 connected to the precessional axles of the gyroscope assemblies rather than to a post mounted eccentrically of a pulley coaxial with the precessional axes. The precessional axles of the gyro assemblies extend sufficiently above the cross arm 12' so that the shaft coupling the pairs of gyroscopes and the fluid cylinders connecting the precessional axles can lie in different horizontal planes, the coupling mechanism being outside of the fluid cylinder, as shown in Fig. 4. Fig. 5 is the same as Fig. 4 except that the coupling mechanism for the gyroscopes has been deleted to show the connection of the fluid cylinders with the gyroscopes.

In Figs. 4 and 5, coupled gyroscopes 21' and 22' are the normal pair which oppose rotation about the OX axis by precessing in opposite directions to each other, the same as in Fig. 3. Attached to the center of the shaft 53 is a disk 58 which engages with a corresponding disk 59 mounted on the shaft 53' which connects the small gears 54' and 55' engaging the large assemble gears 56' and 57' fixed to the precessional axles of gyroscopes 33' and 34'. The gyroscopes 33' and 34' are identical with each other and are mounted for equal and opposite precessions under the influence of rotation of the carrying frame about the same axis as that to which the gyroscopic pair 21' and 22' are sensitive, namely, rotation about the OX axis.

The interlocking arrangement provided by the disks 58 and 59 is designed so that only the gyroscopes 21' and 22' are normally free to precess, the other pair of gyroscopes 33' and 34' being locked in their normal position, see Fig. 7. Just as soon, however, as the gyroscopes 21' and 22' have precessed (under the influence of couples about the OX axis) to the end of their travel— say 60° from their normal position—the second pair of gyroscopes 33' and 34' are released and the gyroscopes 21' and 22' are automatically locked in their positions of maximum precession. As clearly shown in Fig. 7, this is achieved by providing each disk 58 and 59 with a radial slot 60 and 60', respectively. These disks are so arranged that one is adapted to extend into the radial slot in the other and is capable of rotation relative thereto, while the one having the slot which is engaged is locked against rotation. When the one disk is rotated by an amount sufficient to move the slot therein into alignment with the edge of the other disk, the relationship of the two is automatically reversed, or the one previously capable of rotation is automatically locked and the one previously locked is released so that it can rotate. The change in relationship of the two disks comes about automatically because the moment there is a disturbing couple which causes the first pair of gyroscopes to precess, the normally locked pair also try to precess and there is a tendency for the locked disk to be rotated. This tendency becomes a reality the instant the first-mentioned disk has rotated sufficiently far to bring the slot therein into alignment with the initially locked disk.

It is pointed out that there should be some suitable means provided for preventing friction between the two disks which would tend to resist free precession of the gyroscopes. One way in which this could be accomplished would be to freely mount a ball-bearing in one or both side walls of the radial slot in each disk so that they would engage the faces of the disk moving through the slot. This particular structure has not been shown in the drawings because it is believed to be obvious sans illustration, and it is not deemed to be of sufficient importance to warrant the addition of a separate figure to the drawings, the existing figures not being of a nature as to permit such a showing with clarity. Thus in Fig. 7, the disk 58 attached to the shaft 53 is free to rotate through the slot 60' in the disk 59, while the disk 59 attached to the shaft 53' is locked and will remain so until the slot 60 in the disk 58 comes to the top and releases disk 59.

The disposition of the slot is simple to arrange by keying the disks on their respective shafts in the following relationship. If the number of teeth on the small bevel gears 54, 55, 54' and 55' are one-third of those on the large bevel gears 56, 57, 56' and 57', and the gyroscopes are linked for a maximum angular precession of 60°, then a single slot in each disk will be sufficient. It will be readily understood, however, that with other gear ratios, another arrangement of slots would be necessary.

The single slot 60 in the disk 58 is arranged to be vertical whenever the pair of gyroscopes 21' and 22' reach the ends of their precession in either direction, while the single slot 60' in the disk 59 is arranged to be vertical whenever the pair of gyroscopes 33' and 34' are in the normal or central position. I have shown the respective pairs of gyroscopes each connected by a fluid cylinder arrangement construed in accordance with the present invention as fully set forth above for the purpose of urging the individual gyroscopes to their normal positions and for damping oscillations therein. However, it is pointed out that in the arrangement of gyroscopes shown in Figs. 4 and 5 it might be desirable to connect only one pair of gyroscopes with each of the upper and lower assemblies by a fluid cylinder, leaving the other pair free, or it might be desired to leave both pairs of gyroscopes free depending upon the particular application to which the stabilizer is to be put. If it is desired to have the two groups (pairs) of gyroscopes of different sensitivity, for reasons set forth above, and each pair is connected with a fluid cylinder as shown, it would be necessary to make the springs in the respective fluid cylinders of different strength. In this connection, the resistance to precession should be kept as low as possible in the group which normally move first (gyroscopes 21' and 22') and have a stronger resistance to precession in the second group of gyroscopes which are adapted to start precessing after the first group have reached their limit of precession. This desired different degree of sensitivity of the two groups of gyroscopes can also be accomplished by leaving the fluid cylinder arrangement off of the first group of gyroscopes (21' and 22') entirely and having the fluid cylinder arrangement incorporated on the second group of gyroscopes (33' and 34') in the manner disclosed above. In this case, the first group of gyroscopes could be designed to respond to external forces of very small magnitude, while the second group of gyroscopes could be designed to accommodate external forces of larger magnitude, or account for violent movement of the device which might be encountered in actual combat conditions.

It is pointed out that the extension of the time of precession of a gyroscopic stabilizer is not limited to the idea of interlocking one or more of a plurality of gyroscopes arranged to precess in response to rotations of the frame about a given axis. The same result can be obtained, in a measure, by providing a plurality of individual gyroscopes, or groups of gyroscopes, of different sensitivity and leaving them free to precess when a disturbance is encountered strong enough to cause their precession. In such an arrangement, the first gyroscope, or group, would be sensitive to disturbances of small magnitude, while each succeeding gyroscope, or group, would be less sensitive and respond only to disturbances of increasingly large magnitude. The sensitivity of the individual gyroscopes need not be varied by altering the strength of the return spring, as set forth in the embodiments disclosed, but, on the contrary, the sensitivity of the different gyroscopes may be made different by altering the angular momentums of the same.

Although I have shown and described certain specific embodiments of my invention, I am fully aware that many modifications thereof are possible. My invention, therefore, is not to be restricted to the precise details of construction shown and described, but is intended to cover all modifications coming within the scope of the appended claims.

Having thus described my invention, what I claim as new and desire to secure by Letters Patent of the United States is:

1. A gyroscopic stabilizer comprising in combination a supporting base, a pendulous frame pivotally mounted on said base, a plurality of pairs of gyroscopes mounted on said frame so that the individual gyroscopes of a pair are capable of precessing about parallel axes to and from a central position and so that the axes of rotation of said pair of gyroscopes are parallel when in said central position, means for rotating the gyroscopes of each pair in opposite directions at identical angular momentums, means for linking the gyroscopes of each pair so as to permit only equal and opposite precessions thereof, resilient means urging the gyroscopes of each pair toward their central positions, damping means associated with said resilient means for dissipating energy incident to the precessional movements of the gyroscopes during the time that they are in the process of returning to their central positions, means for normally locking one pair of gyroscopes against precession, and means for automatically unlocking said first mentioned pair of gyroscopes when a second pair of gyroscopes has precessed a given amount from their normal position.

2. A gyroscopic stabilizer according to claim 1 in which the means for linking the gyroscopes of each pair includes a pair of pulleys, each associated with different ones of the two gyroscopes and arranged to be rotated by precision thereof, and a crossed belt connecting the two pulleys.

3. A gyroscopic stabilizer according to claim 1 in which the means for linking the gyroscopes includes a direct gearing connection.

4. A gyroscopic stabilizer according to claim 1 in which the means for linking the gyroscopes includes a direct gearing connection, the gearing between one pair of gyroscopes being interlocked with the gearing of a second pair of gyroscopes so that one pair is held against precession until the other pair has precessed a given amount whereupon the previously locked pair is released.

5. A gyroscopic stabilizer according to claim 1 in which the gyroscopes of each pair are directly geared together for equal and opposite precession, the gearing between the pairs of gyroscopes including interlocking elements which permit the precession of one pair of gyroscopes while locking the other pair against precession until the first pair has precessed a given amount whereupon the second pair is automatically released and the first pair is automatically locked against further precession.

6. A gyroscopic stabilizer according to claim 1 in which the means for linking each pair of gyroscopes comprises a bevel gear connected with the precessional axle of each gyroscope, a shaft having bevel gears on each end meshing with the first mentioned bevel gears, the shafts connecting the two pairs of gyroscopes crossing each other at right angles and lying in spaced planes, a disk having a radial slot in its edge fixed to one shaft to rotate therewith, a disk having a radial slot in its edge fixed to the other shaft to rotate therewith, said disks being disposed in adjacent relationship so that the edge of one is adapted to extend into the slot in the other and be capable of rotation relative thereto and at the same time prevent rotation thereof for the purpose of locking one pair of gyroscopes until the other pair has precessed a given amount after which the locked pair are automatically released and the pair which were initially free are automatically locked against further precession.

7. A gyroscopic stabilizer comprising in combination, a supporting base, a pendulous frame pivotally mounted on said base, a plurality of pairs of gyroscopes mounted on said frame so that the individual gyroscopes of each pair are capable of precessing about parallel axes to and from a central position, the gyroscopes of any one pair having their axes of rotation parallel when in said central position, means for rotating the gyroscopes of each pair in opposite directions at identical angular momentums, means for linking the gyroscopes of each pair so as to permit only equal and opposite precessions, resilient means urging the gyroscopes of each pair toward their central positions, and damping means associated with said resilient means for dissipating energy incident to the precessional movements of the gyroscopes during the time that they are in the process of returning to their central positions.

8. A gyroscopic stabilizer according to claim 7, and in which said resilient means is ineffective during the initial part of the precessional movements of the gyroscopes from their normal positions, whereby the sensitivity of the stabilizer is unaffected by said resilient means.

9. A gyroscopic stabilizer according to claim 7, and in which said resilient means includes a compression spring which is not positively connected to either gyroscope.

10. A gyroscope stabilizer according to claim 7, and in which said resilient means and associated damping means comprises a fluid cylinder including a piston and piston rod, said fluid cylinder and piston rod connected between the respective gyroscopes so that the piston rod is withdrawn from the cylinder by the precessional movement of the gyroscopes when moving from said central positions, a spring in said cylinder adapted to resist movement of the piston rod outwardly of said cylinder, and a port in said cylinder to permit a restricted egress of the fluid from the cylinder as the piston rod is forced into the cylinder.

11. A gyroscopic stabilizer according to claim 7, and in which said resilient means and associated damping means comprise a fluid cylinder including a piston and piston rod, said fluid cylinder and piston rod connected between the respective gyroscopes so that the piston rod is withdrawn from the cylinder by the precessional movements of the gyroscopes when moving from said central positions, a compression spring situated between the piston and the end of the cylinder to resist movement of the piston rod outwardly of said cylinder, said spring being of such a size as to be free of compression when said piston rod is at its innermost position in the cylinder, and an adjustable port in said cylinder to permit a restricted egress of the fluid from the cylinder as the piston rod is forced into the cylinder.

12. A gyroscopic stabilizer comprising a pendulously mounted frame to be stabilized with respect to rotation about a given axis, a gyroscope mounted on said frame to precess in response to movements of said frame about said given axis, and thereby tend to stabilize said frame, resilient means urging the gyroscope to its central precessional position, and damping means associated with said resilient means for dissipating energy incident to the precessional movement of the gyroscope only during the time it is in the process of returning to its central precessional position.

13. A gyroscopic stabilizer comprising in combination, a supporting base, a pendulous frame pivotally mounted on said base, a pair of gyroscopes mounted on said frame so that they are individually capable of precessing about parallel axes to and from a central position, the gyroscopes having their axes of rotation parallel when in said central position so that they are both adapted to precess in response to movement of said frame about a given axis, means for normally locking one of said gyroscopes against precession, and means for automatically unlocking said gyroscope when the other gyroscope has precessed a given amount from its central position.

14. A gyroscopic stabilizer according to claim 13 including means for locking said second mentioned gyroscope after it has precessed said given amount and caused the first mentioned gyroscope to be unlocked.

15. A gyroscopic stabilizer according to claim 13 including resilient means urging each of the gyroscopes toward their central positions, and damping means associated with said resilient means for dissipating energy incident to the precessional movements of the gyroscopes during the time that they are in the process of returning to their central positions.

16. A gyroscopic stabilizer comprising in combination, a supporting base, a pendulous frame pivotally mounted on said base, a plurality of gyroscopes mounted on said frame so as to be capable of precessing about parallel axes to and from a central position, and so that their axes of rotation are parallel when they are in said central position, the sensitivity of the several gyroscopes being of different magnitude, whereby the gyroscopic reaction due to the precession of the gyroscopes and acting to stabilize the support is extended to account for disturbing external forces of long duration.

BENJAMIN E. LUBOSHEZ.

REFERENCES CITED

The following references are of record in the file of this patent:

UNITED STATES PATENTS

| Number | Name | Date |
|---|---|---|
| 1,610,853 | Fieux | Dec. 14, 1926 |
| 2,320,354 | Fedde | June 1, 1943 |
| 1,735,058 | Schuler | Nov. 12, 1929 |
| 2,348,974 | Hadekel et al. | May 16, 1944 |

FOREIGN PATENTS

| Number | Country | Date |
|---|---|---|
| 617,576 | France | Nov. 22, 1926 |
| 563,795 | Germany | Nov. 10, 1932 |
| 312,395 | Germany | Sept. 27, 1919 |
| 86,520 | Sweden | Apr. 8, 1936 |